US012303934B2

(12) United States Patent
Morihara

(10) Patent No.: US 12,303,934 B2
(45) Date of Patent: May 20, 2025

(54) METHOD FOR MANUFACTURING LAMINATE

(71) Applicant: SHOWA DENKO MATERIALS CO., LTD., Tokyo (JP)

(72) Inventor: Masumi Morihara, Tagawa (JP)

(73) Assignee: RESONAC CORPORATION, Tokyo (JP)

( * ) Notice: Subject to any disclaimer, the term of this patent is extended or adjusted under 35 U.S.C. 154(b) by 0 days.

(21) Appl. No.: 18/016,019

(22) PCT Filed: Jul. 17, 2020

(86) PCT No.: PCT/JP2020/027896

§ 371 (c)(1),
(2) Date: Jan. 13, 2023

(87) PCT Pub. No.: WO2022/014050

PCT Pub. Date: Jan. 20, 2022

(65) Prior Publication Data

US 2023/0278070 A1 Sep. 7, 2023

(51) Int. Cl.

*B05D 1/38* (2006.01)
*B05D 5/12* (2006.01)
*B05D 7/24* (2006.01)

(52) U.S. Cl.

CPC ................. *B05D 1/38* (2013.01); *B05D 5/12* (2013.01); *B05D 7/24* (2013.01)

(58) Field of Classification Search

CPC ....... B05D 5/12; C23C 18/16; C23C 18/1601; C23C 18/1646; C23C 18/1658; C23C 18/166; C23C 18/44
USPC ....................... 205/126; 106/1.14, 1.19, 1.23
See application file for complete search history.

(56) References Cited

U.S. PATENT DOCUMENTS

| | | | | |
|---|---|---|---|---|
| 10,043,708 | B2 * | 8/2018 | Sardesai | H01L 21/76829 |
| 2002/0082416 | A1 * | 6/2002 | Park | C12N 15/1003 536/25.41 |
| 2003/0005838 | A1 * | 1/2003 | Damme | B41C 1/1066 101/467 |
| 2003/0099760 | A1 * | 5/2003 | Okai | A23L 27/21 426/650 |
| 2003/0190555 | A1 * | 10/2003 | Nagase | G03F 7/322 430/944 |
| 2004/0020787 | A1 * | 2/2004 | Sano | C02F 1/4618 205/628 |
| 2004/0028601 | A1 * | 2/2004 | Torii | C04B 35/62645 423/598 |
| 2004/0094406 | A1 * | 5/2004 | Sawada | C02F 1/4618 204/263 |
| 2004/0256089 | A1 * | 12/2004 | Kobayashi | F28F 13/18 165/133 |
| 2006/0024448 | A1 | 2/2006 | Mori | |
| 2020/0157685 | A1 * | 5/2020 | Kitamoto | C23C 18/1204 |

FOREIGN PATENT DOCUMENTS

| | | | | |
|---|---|---|---|---|
| CN | 1733474 | | 2/2006 | |
| JP | 2003-19765 | | 1/2003 | |
| JP | 2005-213345 | | 8/2005 | |
| JP | 2005213345 | A * | 8/2005 | |
| JP | 2006-45595 | | 2/2006 | |
| JP | 2008-19485 | | 1/2008 | |
| JP | 2008031526 | A * | 2/2008 | B22F 1/0018 |
| JP | 2008-63592 | | 3/2008 | |
| JP | 2008-106081 | | 5/2008 | |
| JP | 2009242875 | A * | 10/2009 | |
| JP | 4480408 | B2 * | 6/2010 | |
| JP | 2014-139291 | | 7/2014 | |
| JP | 5610359 | B2 * | 10/2014 | |
| JP | 2019-19234 | | 2/2019 | |
| JP | 2019-177311 | | 10/2019 | |
| KR | 10-1857779 | | 5/2018 | |
| KR | 101857779 | B1 * | 5/2018 | H01B 1/22 |
| WO | 2019/187328 | | 10/2019 | |
| WO | WO-2019187328 | A1 * | 10/2019 | |

OTHER PUBLICATIONS

Maryniak et al. Surface Resistivity and Surface Resistance Measurements Using a Concentric Ring Probe Technique. Advancedenergy.com, 2020. Retrieved from <<https://www.advancedenergy.com/getmedia/779e77c3-a07e-4c26-be3b-424bacc6622b/en-esd-surface-resistivity-application-note.pdf>> on Feb. 22, 2024. (Year: 2020).*
J. A. Jacob et al., "Role of Phenol Derivatives in the Formation of Silver Nanoparticles," Langmuir 2008, 24, 528-533. (Year: 2008).*
International Search Report (ISR) issued Sep. 24, 2020 in International (PCT) Application No. PCT/JP2020/027896.

* cited by examiner

*Primary Examiner* — William P Fletcher, III
(74) *Attorney, Agent, or Firm* — Wenderoth, Lind & Ponack, L.L.P.

(57) ABSTRACT

A method for manufacturing a laminate, the method comprising a process of forming a silver-particle layer on a substrate, the process comprising allowing an aqueous solution of ammoniacal silver nitrate to contact with an aqueous solution of a reducing agent, and the aqueous solution of a reducing agent comprising a phenol compound as the reducing agent.

9 Claims, 4 Drawing Sheets

METHOD FOR MANUFACTURING LAMINATE

TECHNICAL FIELD

The present disclosure relates to a method for manufacturing a laminate.

BACKGROUND ART

There have been remarkable improvements in safety systems for automobiles of recent years. For example, automatic collision-avoidance systems have become standard equipment for automobiles.

An automatic collision-avoidance system is a system that functions to brake automatically based on the image data, which is obtained from a car camera, and the information of relative distance between a car body and an object, which is obtained from a millimeter-wave radar.

The transceiver of a millimeter-wave radar is preferably disposed at the center of a front of a car body. Generally, an emblem is disposed at the center of a front of a car body. Therefore, the transceiver of a millimeter-wave radar is preferably disposed behind an emblem of a car body.

Emblems for antomobiles generally have, on a substrate made of resin or the like, a metallic film that imparts a metallic sheen to the substrate. For example, Japanese Patent Application Laid-Open No. 2003-019765 describes a method for forming a metallic film on a substrate by silver mirror reaction.

SUMMARY OF THE INVENTION

Problems to be Solved by the Invention

In the invention described in Japanese Patent Application Laid-Open No. 2003-019765, transmissiveness of a metallic film with respect to a millimeter-wave radar is not a matter for consideration.

In view of the foregoing, the present disclosure aims to provide a method for manufacturing a laminate which has a metallic sheen and exhibits excellent transmissiveness with respect to a millimeter-wave radar.

Means for Solving the Problem

Specific means for implementing the problem include the following embodiments.

<1> A method for manufacturing a laminate, the method comprising a process of forming a silver-particle layer on a substrate, the process comprising allowing an aqueous solution of ammoniacal silver nitrate to contact with an aqueous solution of a reducing agent, and the aqueous solution of a reducing agent comprising a phenol compound as the reducing agent.

<2> The method for manufacturing a laminate according to <1>, wherein the phenol compound comprises hydroquinone.

<3> The method for manufacturing a laminate according to <1> or <2>, wherein the silver-particle layer has a surface resistivity of $10^5 \Omega/\square$ or more.

<4> The method for manufacturing a laminate according to any one of <1> to <3>, which is directed to manufacture of a component for an automobile.

According to the present disclosure, a method for manufacturing a laminate which has a metallic sheen and exhibits excellent transmissiveness with respect to a millimeter-wave radar is provided.

EMBODIMENTS FOR IMPLEMENTING THE INVENTION

Figure 1:
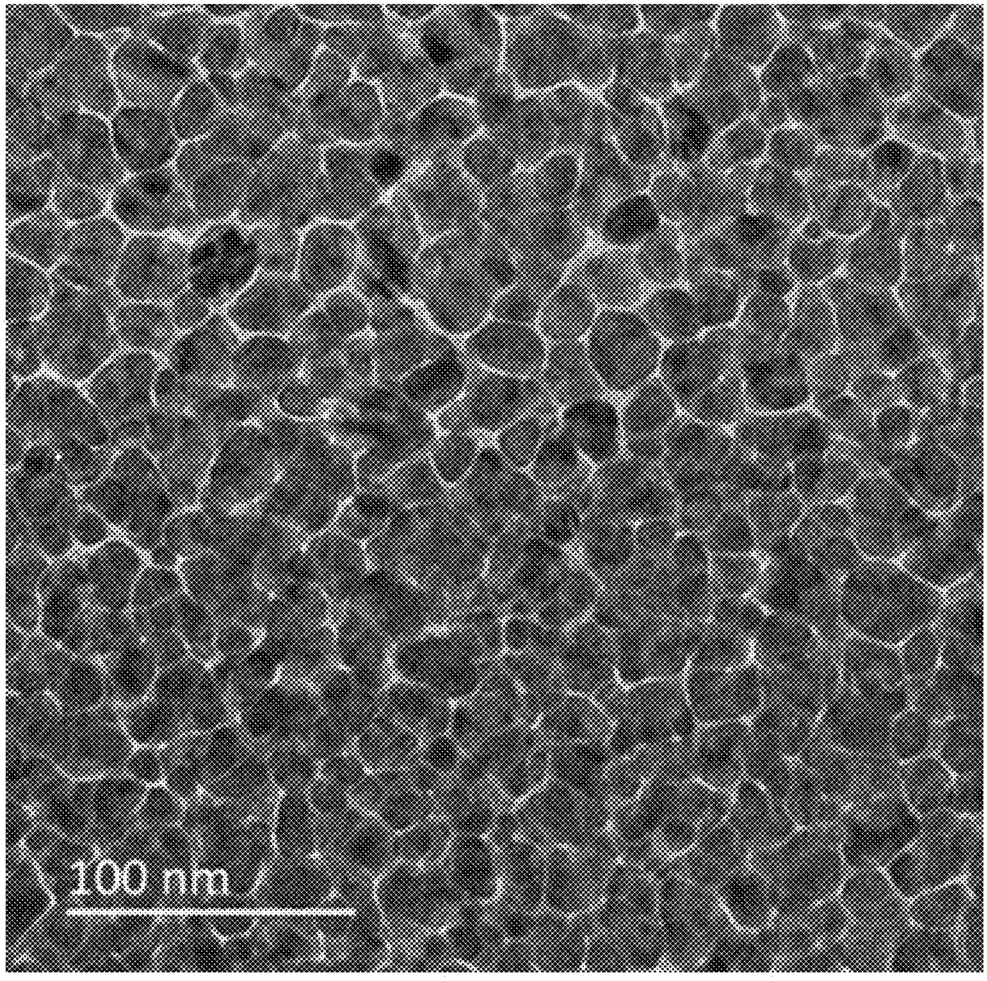
FIG. 1 is an electron microscope photograph of a silver-particle layer obtained in Example 1.

Embodiments for carrying out the present disclosure will now be described in detail. However, the present disclosure is in no way limited to the following embodiments.

In the following embodiments, constituent elements (including element steps and the like) of the embodiments are not essential, unless otherwise specified. Likewise, numerical values and ranges thereof are not intended to restrict the invention.

In the present disclosure, the definition of the term "step" includes not only an independent step which is distinguishable from another step, but also a step which is not clearly distinguishable from another step, as long as the purpose of the step is achieved.

In the present disclosure, any numerical range described using the expression "from * to" represents a range in which numerical values described before and after the "to" are included in the range as a minimum value and a maximum value, respectively.

In a numerical range described in stages, in the present disclosure, an upper limit value or a lower limit value described in one numerical range may be replaced with an upper limit value or a lower limit value in another numerical range described in stages. Further, in a numerical range described in the present disclosure, the upper limit value or the lower limit value in the numerical range may be replaced with a value shown in the Examples.

In the present disclosure, each component may include plural kinds of substances corresponding to the component. In a case in which plural kinds of substances corresponding to each component are present in a composition, the content ratio or content of each component refers to the total content ratio or content of the plural kinds of substances present in the composition, unless otherwise specified.

In the present disclosure, particles corresponding to each component may include plural kinds of particles. In a case in which plural kinds of particles corresponding to each component are present in a composition, the particle size of each component refers to the value of the particle size of a mixture of the plural kinds of particles present in the composition, unless otherwise specified.

In the present disclosure, the term "layer" includes, when a region where a layer is present is observed, a case in which a layer is formed at a portion of the region, in addition to a case in which a layer is formed at an entire region.

<Method for Manufacturing Laminate>

The method for manufacturing a laminate of the present disclosure is a method for manufacturing a laminate, the method comprising a process of forming a silver-particle layer on a substrate (hereinafter, silver-particle layer forming process), the process comprising allowing an aqueous solution of ammoniacal silver nitrate to contact with an aqueous solution of a reducing agent, and the aqueous solution of a reducing agent comprising a phenol compound as the reducing agent.

The laminate manufactured by the method of the present disclosure has a metallic sheen and exhibits excellent transmissiveness with respect to a millimeter-wave radar. Possible causes for this, although not fully understood, are as follows.

When a silver-particle layer formed on a substrate by the method of the present disclosure is observed with an electron microscope, silver particles of relatively uniform size are arranged in the silver-particle layer. Therefore, millimeter-waves from a millimeter-wave radar readily pass through the interstices among the silver particles.

Further, it is thought that a silver-particle layer in which silver particles with relatively uniform size are arranged is readily formed by using a phenol compound as a reducing agent. Possible causes for this, although not fully understood, are that the progression of reduction reaction is moderate when a phenol compound is used as a reducing agent, as compared with a case in which a different reducing agent is used, whereby a rate of growth of silver particles tends to be uniform.

The method may be conducted without using a dispersant. When a dispersant is used to form a silver-particle layer, the dispersant coats a surface of silver particles and suppresses aggregation of silver particles. Meanwhile, a dispersant may cause a plasmon phenomenon to express at a surface of silver particles, thereby failing to achieve a desired color hue.

As a result of studies made by the present inventor, it was proved that a silver-particle layer that can transmit a millimeter-wave radar can be obtained without using a dispersant, by using a phenol compound as a reducing agent.

In the following, components used in the method of the present disclosure are explained.

—Substrate—

The material for the substrate is not particularly limited, and inorganic materials such as glass and organic materials such as resin may be used for the substrate. Examples of the resin include thermosetting resin and thermoplastic resin.

Examples of the thermoplastic resin include polyethylene, polypropylene, polycarbonate, polystyrene, polyvinyl chloride, vinyl polymer, polyester, polyamide, ABS resin (acrylonitrile/butadiene/styrene copolymer resin), polyester and thermoplastic elastomer.

Examples of the thermosetting resin include silicone resin, polyurethane resin, polyester resin, melamine resin, epoxy resin, phenol resin and urea resin.

In a case of using a laminate as a component for automobiles, such as an emblem, the material for a substrate is preferably polypropylene, polycarbonate, ABS resin or the like.

Polypropylene has a relatively small specific gravity in resins, favorable processability, high levels of impact strength and compression strength, and excellent weather resistance and heat resistance.

ABS resin is relatively easy to perform a surface treatment among plastic materials, and is compatible with a treatment such as coating after formation of a substrate. Further, ABS resin has excellent chemical resistance, stiffness, impact resistance, heat resistance and cold resistance.

Polycarbonate has a relatively high impact resistance in plastic materials, and excellent weather resistance, heat resistance and transparency. Further, polycarbonate has favorable processability, and is relatively light and strong in plastic materials.

The substrate may have an undercoat layer for the purpose of improving the adhesion between the substrate and the silver-particle layer, smoothing a surface of the substrate, or the like.

The material for the undercoat layer is not particularly limited, and may be selected depending to the purpose of the undercoat layer. For example, the material may be fluorine resin, polyester resin, epoxy resin, melamine resin, silicone resin, acrylic silicone resin, and acrylic urethane resin. The resin may be in a state of coating agent added with a solvent or the like.

The thickness of the undercoat layer is not particularly limited. From the viewpoint of securing a smooth surface, the thickness is preferably approximately from 5 μm to 25 μm.

A primer layer may be disposed between the undercoat layer and the substrate main body, for the purpose of improving the adhesion between the undercoat layer and the substrate main body.

The thickness of the substrate may be determined depending on the purpose of the laminate. The shape of the substrate is not particularly limited.

—Silver-Particle Layer—

In the method of the present disclosure, formation of a silver-particle layer is conducted by allowing an aqueous solution of ammoniacal silver nitrate to contact with an aqueous solution of a reducing agent.

In an embodiment of the present disclosure, an aqueous solution of ammoniacal silver nitrate is obtained by dissolving silver nitrate, ammonia and an amine compound in water, wherein the amine compound is at least one selected from the group consisting of an aminoalcohol compound, an amino acid and an amino acid salt.

Specific examples of the amine compound include aminoalcohol compound such as monoethanol amine, diethanol amine, diisopropanol amine, triethanol amine and triisopropanol amine; and amino acids or salts thereof such as glycin, alanine and sodium glycinate.

The contents of the silver nitrate, ammonia and amine compound in the aqueous solution of ammoniacal silver nitrate are not particularly limited.

The concentration of the silver nitrate in the aqueous solution of ammoniacal silver nitrate is not particularly limited. From the viewpoint of regulating the reaction rate, the concentration is preferably within a range of from 0.1% by mass to 10% by mass.

The pH of the aqueous solution of ammoniacal silver nitrate is preferably adjusted to a range of from 10 to 13, more preferably from 11 to 12.

In an embodiment of the present disclosure, the aqueous solution of a reducing agent is obtained by dissolving a reducing agent including a phenol compound and a strong alkaline substance.

Examples of the phenol compound included in the reducing agent include benzene diol compounds such as hydroquinone, catechol and resorcinol, preferably hydroquinone.

The reducing agent may be a phenol compound alone or a combination of a phenol compound and a compound other than a phenol compound. Examples of the compound other than a phenol compound include hydrazine compounds such as hydrazine sulfate, hydrazine carbonate and hydrazine hydrate, sulfite compounds such as sodium sulfite, and thiosulfate compounds such as sodium thiosulfate.

When the reducing agent includes a phenol compound and a compound other than a phenol compound, the amount of phenol compound in the total reducing agent is preferably 50% by mass or more, more preferably 70% by mass or more, further preferably 90% by mass or more.

Specific examples of the strong alkaline substance include sodium hydroxide and potassium hydroxide.

The aqueous solution of a reducing agent may include an amine compound as described above, as necessary.

The aqueous solution of a reducing agent may include a compound having a formyl group, as necessary. Specific examples of the compound having a formyl group include glucose and glyoxal.

The contents of the reducing agent, strong alkaline substance, amine compound as an optional compound and a compound having a formyl group as an optional compound are not particularly limited.

The concentration of the reducing agent in the aqueous solution of a reducing agent is not particularly limited. From the viewpoint of regulating the reaction rate, the concentration of the reducing agent is preferably adjusted within a range of from 0.1% by mass to 10% by mass.

The pH of the aqueous solution of a reducing agent is preferably adjusted within a range of from 10 to 13, more preferably from 10.5 to 11.5.

(Process for Forming Silver-Particle Layer)

In a process for forming a silver-particle layer, the method for allowing an aqueous solution of ammoniacal silver nitrate to contact with an aqueous solution of a reducing agent is not particularly limited. For example, the aqueous solutions may be mixed and applied onto a surface of a substrate, or the aqueous solutions may be applied separately onto a surface of a substrate.

The method for applying an aqueous solution of ammoniacal silver nitrate and an aqueous solution of a reducing agent onto a surface to be subjected to silver mirror reaction. Spray coating is a suitable application method in terms of forming a uniform silver-particle layer irrespective of the shape of a substrate. Spray coating may be performed using a known device such as an air brush or a spray gun.

(Process for Surface Activation Treatment)

As necessary, a surface activation treatment may be performed at a surface of a substrate prior to forming a silver-particle layer.

In an embodiment of the present disclosure, a surface activation treatment solution, containing an inorganic tin compound, is applied onto a surface of a substrate. In that way, tin is disposed at a surface of a substrate. The presence of tin between the silver particle layer and the substrate tends to improve the adhesion between the substrate and silver particles.

Examples of the inorganic tin compound included in a surface activation treatment solution include tin chloride (II), tin oxide (II) and tin sulfate (II).

As necessary, the surface activation treatment solution may include a component such as hydrogen chloride, hydrogen peroxide or a polyvalent alcohol.

The concentration of the components in the surface activation treatment solution is not particularly limited.

The pH of the surface activation treatment solution is preferably adjusted within a range of from 0.5 to 3.0, more preferably from 0.5 to 1.5.

Examples of the method for applying a surface activation treatment solution to a surface of a substrate include immersing a substrate in a surface activation treatment solution or coating a surface of a substrate with a surface activation treatment solution. Among these, spray coating is suitable in terms of applying a surface activation treatment solution in a uniform manner irrespective of the shape of a substrate.

After performing a surface activation treatment, an excess portion of the surface activation treatment solution is preferably removed from a surface of a substrate. For example, a surface of a substrate is preferably washed with deionized water or pure water.

(Process for Pretreatment)

As necessary, a pretreatment may be performed at a surface of a substrate prior to forming a silver-particle layer.

In an embodiment of the present disclosure, an aqueous solution of silver nitrate is applied to a surface of a substrate after a surface activation treatment as mentioned above. In that way, silver is disposed at a surface of a substrate. The presence of silver between a silver-particle layer and a substrate tends to cause precipitation of silver particles of relatively uniform size.

The pH of the pretreatment solution is preferably adjusted within a range of from 4.0 to 8.0, more preferably from 6.0 to 7.0.

Examples of the method for applying a pretreatment solution to a surface of a substrate include immersing a substrate in a pretreatment solution or coating a surface of a substrate with a pretreatment solution. Among these, spray coating is suitable in terms of applying a pretreatment solution in a uniform manner irrespective of the shape of a substrate.

(Process for Deactivation Treatment)

As necessary, a deactivation treatment may be performed after forming a silver-particle layer on a surface of a substrate.

In an embodiment of the present disclosure, a deactivation treatment solution, which is an aqueous solution including a strong alkaline substance such as potassium hydroxide and a sulfite salt such as sodium sulfite, is allowed to contact with a silver-particle layer. In that way, the reaction activity of silver in a silver-particle layer with residual ions such as chloride ion or sulfide ion can be lowered.

The contents of the components in the deactivation treatment solution are not particularly limited.

The pH of the deactivation treatment solution is preferably adjusted within a range of from 4.0 to 8.0, more preferably from 7.0 to 8.0.

Examples of the method for applying a deactivation treatment solution to a surface of a substrate include immersing a substrate in a deactivation treatment solution or coating a surface of a substrate with a deactivation treatment solution. Among these, spray coating is suitable in terms of applying a deactivation treatment solution in a uniform manner irrespective of the shape of a substrate.

Before and after performing a deactivation treatment, the silver-particle layer is preferably washed with deionized water or pure water.

The thickness of the silver-particle layer formed on a substrate is not particularly limited. From the viewpoint of achieving a sufficient degree of metallic sheen, the thickness is preferably 50 nm or more. From the viewpoint of achieving a sufficient degree of transmissiveness with respect to a millimeter-wave radar, the thickness is preferably 300 nm or less.

When a section of the silver-particle layer in a thickness direction is observed, the proportion of silver particles in the silver-particle layer is preferably 95% or less. When the proportion of silver particles in the silver-particle layer is 95% or less, transmissiveness with respect to a millimeter-wave radar tends to further improve. From the viewpoint of achieving a sufficient degree of metallic sheen, the proportion of silver particles in the silver-particle layer is preferably 80% or more.

The proportion of silver particles in the silver-particle layer is a value measured by the following method.

A photograph of a section of a silver-particle layer in a thickness direction is obtained with a transmission electron microscope at a magnification of 300,000. A center line in the section of the silver-particle layer in a thickness direction is determined, and a length of portions at which silver particles overlap the center line is measured. The percentage obtained by dividing a length of portions at which silver particles overlap the center line by a total length of the center line is defined as the proportion of silver particles in the silver-particle layer.

The silver-particle layer preferably has a surface resistivity of $10^5\Omega/\square$ or more, more preferably $10^7\Omega/\square$ or more.

When the silver-particle layer has a surface resistivity within the above range, it can be determined that the silver-particle layer achieves a sufficient degree of transmissiveness with respect to a millimeter-wave radar.

The upper limit of the surface resistivity of the silver-particle layer is not particularly limited.

The surface resistivity of the silver-particle layer is measured by a method according to JIS K6911:2006.

—Topcoat Layer—

The laminate may have a layer other than a substrate and a silver-particle layer, as necessary. For example, the laminate may have a topcoat layer on the silver-particle layer for the purpose of protecting the silver-particle layer.

The topcoat layer preferably has a degree of transparency that does not conceal a metallic sheen of the silver-particle layer, or does not block the transmission of millimeter-waves. The topcoat layer may be colorless-and-clear or colored-and-clear.

The material for the topcoat layer is not particularly limited. For example, the material may be selected from those described as a material for an undercoat layer of the substrate.

The thickness of the topcoat layer is not particularly limited, and is preferably approximately from 20 μm to 40 μm. When the thickness of the topcoat layer is 20 μm or more, the topcoat layer tends to sufficiently protect the silver-particle layer. When the thickness of the topcoat layer is 40 μm or less, the topcoat layer tends to be less prone to cracks, separation or insufficient adhesion due to temporal changes.

(Application of Laminate)

The laminate of the present disclosure has a metallic sheen and excellent transmissiveness with respect to a millimeter-wave radar. Therefore, the laminate is especially suitably used as a component for automobiles, such as an emblem. Specifically, when the laminate is disposed at a front of a car body, the laminate can function as an emblem while not preventing the transmission and receipt of millimeter waves by a transceiver being disposed behind the laminate. The laminate may be applied for other interior or exterior components.

EXAMPLES

In the following, the present disclosure is explained by referring to the examples. However, the present disclosure is not limited to the examples.

Example 1

(1) Preparation of Substrate

A polycarbonate substrate with a thickness of 2 mm was wiped with a cloth applied with isopropyl alcohol to remove oil films, stains or dirts on the surface thereof. Thereafter, the substrate was dried.

(2) Surface Activation Treatment

The substrate with an undercoat layer formed thereof is spray-washed with pure water. Thereafter, a surface activation treatment solution (MSPS-Sa1A, Mitsubishi Paper Mills Limited) was applied to the substrate by spray coating. Thereafter, the substrate was spray-washed with pure water. The surface activation treatment solution used in the process is an aqueous solution including tin chloride (II), hydrogen chloride, hydrogen peroxide and polyvalent alcohol with a pH of 1.0.

(3) Pretreatment Process

A pretreatment solution (MSPS-Sa2A, Mitsubishi Paper Mills Limited) was applied by spray coating to the substrate after being subjected to a surface activation treatment. Thereafter, the substrate was spray-washed with pure water. The pretreatment solution used in the process is an aqueous solution of silver nitrate with a pH of 6.8.

(4) Silver-Particle Layer Formation

An aqueous solution of ammoniacal silver nitrate and an aqueous solution of a reducing agent were applied by spray coating to a surface of the substrate after being subjected to a pretreatment. The aqueous solutions were applied to the substrate simultaneously with different air brushes. The ejection amounts of air brushes were from 1.0 g/10 seconds to 1.5 g/10 seconds, respectively. During the process, silver particles precipitated at a surface of the substrate by silver mirror reaction, whereby a silver-particle layer (thickness: 0.2 μm) having a silver sheen was formed. Thereafter, the substrate was spray-washed with pure water.

The aqueous solution of ammoniacal silver nitrate used in the process is an aqueous solution including silver nitrate, ammonia and triethanolamine with a pH of 11.5 (silver nitrate concentration: 0.5% by mass).

The aqueous solution of a reducing agent used in the process is an aqueous solution including hydroquinone, triethanolamine and sodium hydroxide with a pH of 10.8 (hydroquinone concentration: 4.5% by mass).

(5) Deactivation Treatment

A deactivation treatment solution (MSPS-R1A, Mitsubishi Paper Mills Limited) was applied by spray coating to the substrate after being subjected to a process for forming silver-particle layer. Thereafter, the substrate was spray-washed with pure water. The deactivation treatment solution used in the process is an aqueous solution including potassium hydroxide and a sulfite salt with a pH of 7.5.

Comparative Example 1

A silver-particle layer (thickness: 0.13 μm) was formed on a substrate in the same manner as Example 1, except that an aqueous solution including hydrazine sulfate instead of hydroquinone (pH: 10.1) was used as the aqueous solution of a reducing agent.

<Evaluation>

(1) Observation with Electron Microscope

FIG. 1 is a photograph of a front side of the silver-particle layer of the laminate prepared in Example 1 obtained with a transmission electron microscope (JEM-2100, JEOL Ltd.)

Figure 2:
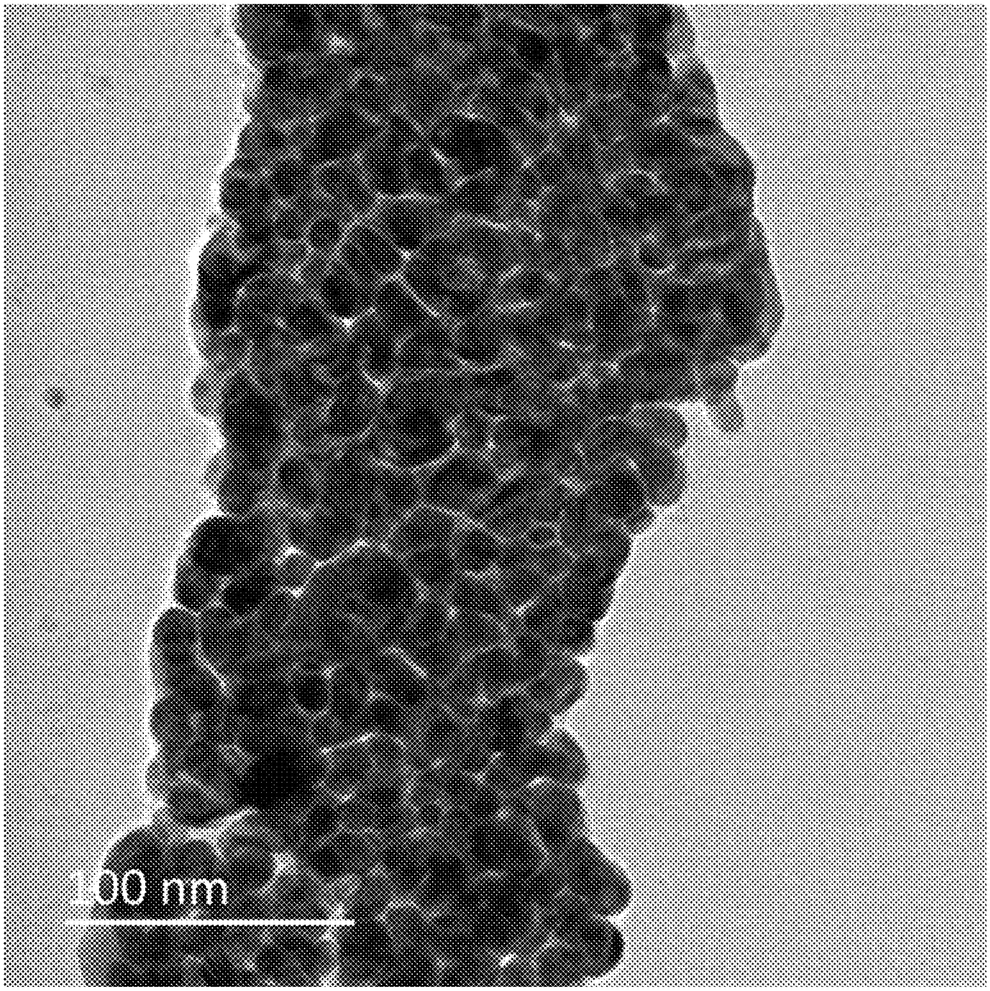
FIG. 2 is an electron microscope photograph of a silver-particle layer obtained in Example 1.

FIG. 2 is a photograph of a section of the silver-particle layer of the laminate prepared in Example 1 obtained with a transmission electron microscope (JEM-2100, JEOL Ltd.)

Figure 3:
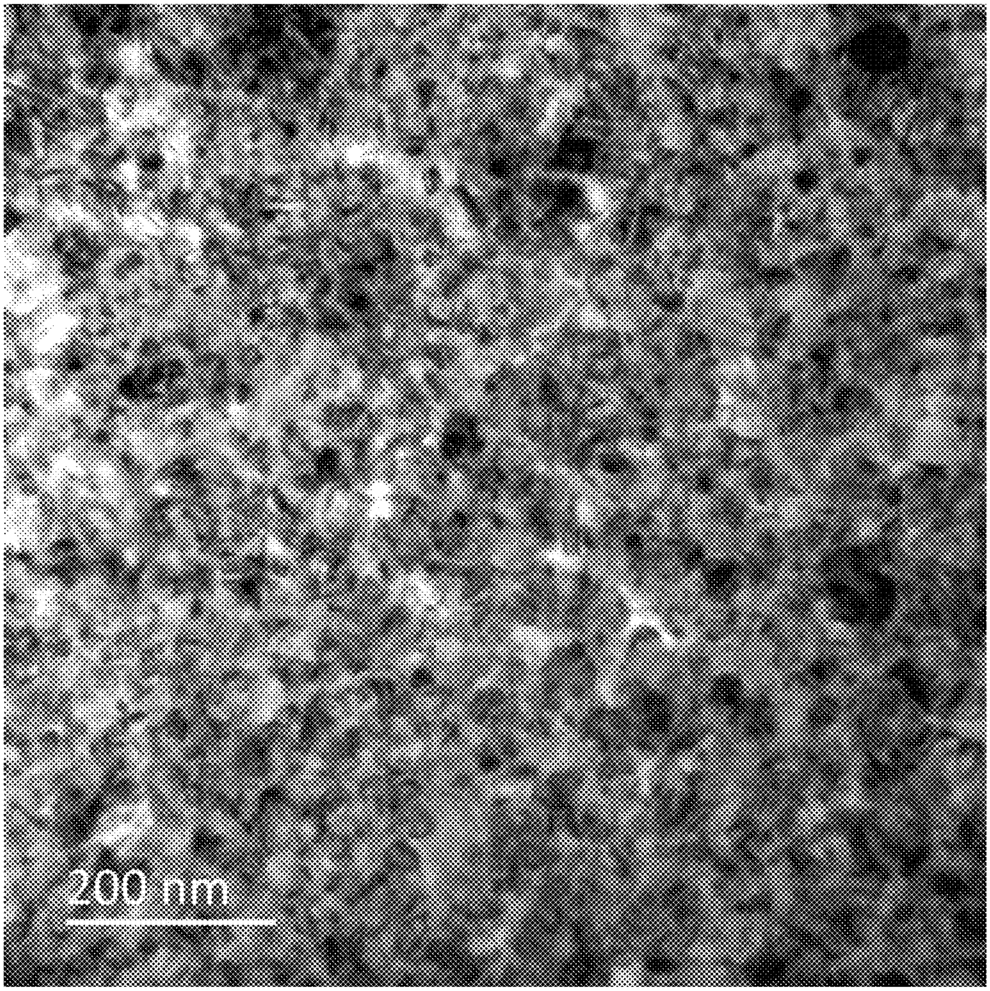
FIG. 3 is an electron microscope photograph of a silver-particle layer obtained in Comparative Example 1.

FIG. 3 is a photograph of a front side of the silver-particle layer of the laminate prepared in Comparative Example 1 obtained with a transmission electron microscope (JEM-2100, JEOL Ltd.)

Figure 4:
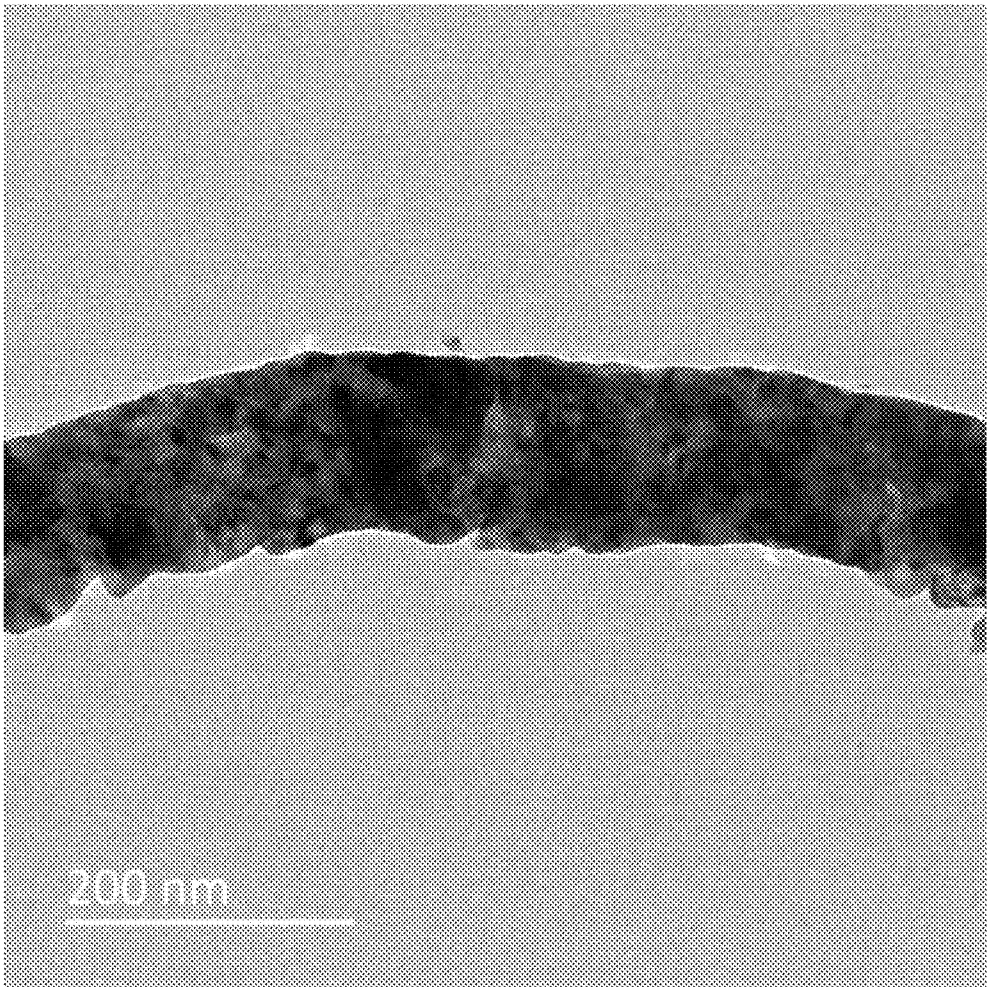
FIG. 4 is an electron microscope photograph of a silver-particle layer obtained in Comparative Example 1.

FIG. 4 is a photograph of a section of the silver-particle layer of the laminate prepared in Comparative Example 1 obtained with a transmission electron microscope (JEM-2100, JEOL Ltd.)

As shown in FIG. 1 and FIG. 2, silver particles with relatively uniform size were arranged in the silver-particle layer of Example 1.

As shown in FIG. 3 and FIG. 4, the silver-particle layer of Comparative Example 1 was in a state of a solid bulk formed by aggregated silver particles.

(2) Measurement of Surface Resistivity

The surface resistivity of the silver-particle layer of the laminate prepared in Example 1 was measured by a four-probe method with a low-resistivity meter (trade name: LORESTA EP, Dia Instruments). The result was $2.2\times10^5$ Ω/□.

The surface resistivity of the silver-particle layer of the laminate prepared in Comparative Example 1 was measured by a four-probe method with a low-resistivity meter (trade name: LORESTA EP, Dia Instruments). The result was $1.1\times10^0$Ω/□.

(3) Measurement of Millimeter-Wave Transmission Attenuation Amount

A composition for forming a topcoat layer was prepared by mixing TOPCOAT CLEAR M for MSPS, TOPCOAT THINNER P-7 for MSPS and TOPCOAT CURING AGENT W for MSPS (Ohashi Chemical Industries Ltd.) at a mass ratio of 20:20:5. The composition was applied onto the silver-particle layer of the laminates prepared in Example 1 and Comparative Example 1 by spray coating, thereby forming a topcoat layer with a thickness of 25 μm.

The laminate with a topcoat layer formed thereon of Example 1 was exposed to millimeter waves (77.0125 GHz) by the following method, and the amount of transmission attenuation of the millimeter waves was measured. The result was 0.99 dB.

The laminate with a topcoat layer formed thereon of Comparative Example 1 was subjected to the same measurement. The result was 50.05 dB.

The amount of transmission attenuation is defined by JIS R 1679:2007 (Measurement methods for reflectivity of electromagnetic wave absorber in millimeter wave frequency).

Specifically, the amount of transmission attenuation was calculated by the following formula from a transmission coefficient (absolute value). The transmission coefficient is obtained by a free space method, in which a sample is disposed between a transmission antenna and a receiving antenna and exposed to electromagnetic waves in a vertical direction.

$$\text{Amount of transmission attenuation}=20\log_{10}|(\text{transmission coefficient})|$$

The results indicate that the transmissiveness with respect to a millimeter-wave radar of a silver-particle layer is improved by using a phenol compound as a reducing agent in the formation of a silver-particle layer, as compared with a case in which a compound other than a phenol compound is used as a reducing agent in the formation of a silver-particle layer.

All publications, patent applications, and technical standards mentioned in the present specification are incorporated herein by reference to the same extent as if each individual publication, patent application, or technical standard was specifically and individually indicated to be incorporated by reference.

The invention claimed is:

1. A method for manufacturing a laminate, the method comprising a process of forming a silver-particle layer on a substrate, the process comprising allowing an aqueous solution of ammoniacal silver nitrate to contact with an aqueous solution of a reducing agent, and the aqueous solution of the reducing agent comprising a phenol compound as the reducing agent, an alkaline substance and an amine compound, wherein the silver-particle layer has a surface resistivity of $10^5$Ω/□ or more.

2. The method for manufacturing a laminate according to claim 1, wherein the phenol compound comprises a benzene diol compound.

3. The method for manufacturing a laminate according to claim 1, which is directed to manufacture of a component for an automobile.

4. The method for manufacturing a laminate according to claim 1, wherein the phenol compound comprises hydroquinone.

5. The method for manufacturing a laminate according to claim 1, wherein the alkaline substance comprises sodium hydroxide or potassium hydroxide.

6. The method for manufacturing a laminate according to claim 1, wherein the amine compound is an amino alcohol.

7. A method for manufacturing a laminate, the method comprising a process of forming a silver-particle layer on a substrate, the process comprising allowing an aqueous solution of ammoniacal silver nitrate to contact with an aqueous solution of a reducing agent, and the aqueous solution of the reducing agent comprising a phenol compound as the reducing agent, an alkaline substance and an amine compound.

8. The method for manufacturing a laminate according to claim 7, wherein the alkaline substance comprises sodium hydroxide or potassium hydroxide.

9. The method for manufacturing a laminate according to claim 7, wherein the amine compound is an amino alcohol.

* * * * *